United States Patent
Bozarth et al.

(10) Patent No.: US 8,913,004 B1
(45) Date of Patent: Dec. 16, 2014

(54) ACTION BASED DEVICE CONTROL

(75) Inventors: Bradley J. Bozarth, Sunnyvale, CA (US); Kenneth M. Karakotsios, San Jose, CA (US); Jeffrey P. Bezos, Greater Seattle Area, WA (US)

(73) Assignee: Amazon Technologies, Inc., Reno, NV (US)

( * ) Notice: Subject to any disclaimer, the term of this patent is extended or adjusted under 35 U.S.C. 154(b) by 622 days.

(21) Appl. No.: 12/718,788

(22) Filed: Mar. 5, 2010

(51) Int. Cl.
*G09G 5/00* (2006.01)
*G06F 3/038* (2013.01)
*G06K 9/00* (2006.01)
*G06F 1/00* (2006.01)

(52) U.S. Cl.
USPC ........... 345/156; 382/117; 382/118; 345/211; 713/300; 348/78

(58) Field of Classification Search
CPC ................................ G06F 3/005; G06F 3/013
USPC .................. 345/156, 173, 157, 211; 382/103, 382/117–118; 348/78; 715/700, 767, 802; 351/209; 713/300; 396/51; 700/12–15
See application file for complete search history.

(56) References Cited

U.S. PATENT DOCUMENTS

| | | | |
|---|---|---|---|
| 7,036,025 B2 * | 4/2006 | Hunter ........................ | 713/300 |
| 8,225,229 B2 * | 7/2012 | Thorn et al. .................. | 715/802 |
| 8,447,070 B1 | 5/2013 | Bozarth et al. | |
| 2002/0113782 A1 * | 8/2002 | Verberne et al. ............. | 345/204 |
| 2003/0085870 A1 * | 5/2003 | Hinckley ..................... | 345/156 |
| 2004/0175020 A1 * | 9/2004 | Bradski et al. ................ | 382/103 |
| 2006/0087502 A1 * | 4/2006 | Karidis et al. ................ | 345/211 |
| 2006/0192775 A1 * | 8/2006 | Nicholson et al. ........... | 345/211 |
| 2007/0198286 A1 | 8/2007 | Tomita | |
| 2007/0247524 A1 * | 10/2007 | Yoshinaga et al. ............. | 348/78 |
| 2008/0111833 A1 * | 5/2008 | Thorn et al. .................. | 345/690 |
| 2009/0141895 A1 | 6/2009 | Anderson et al. | |
| 2010/0079508 A1 * | 4/2010 | Hodge et al. ................. | 345/697 |
| 2010/0205667 A1 | 8/2010 | Anderson et al. | |

OTHER PUBLICATIONS

Cornell, J., "Does This Headline Know You're Reading it?" *h+ Magazine*, Mar. 19, 2010, located at <http://hplusmagazine.com/articles/ai/does-headline-know-you%E2%80%99re-reading-it>, last accessed on Jun. 7, 2010, 4 pages.
"Non Final Office Action dated Jul. 8, 2013", U.S Appl. No 12/763,115, filed Jul. 8, 2013, 32 pages.
Cornell, J., Does This Headline Know You're reading it? *h+ Magazine*, Mar. 19, 2010, located at http://hplusmagazine.com/articles/ai/does-headline-know-you%E2%80%99reading-it>, last acessed on Jun. 7, 2010, 4 pages.

* cited by examiner

*Primary Examiner* — Matthew Fry
(74) *Attorney, Agent, or Firm* — Novak Druce Connolly Bove + Quigg LLP

(57) ABSTRACT

The determination of a gaze direction or field of view of a user with respect to a computing device can control aspects of the device, such as to reduce power or resource consumption. A computing device can include an imaging element and software for locating aspects of a user's facial features relative to the device, such that an orientation of the user's features relative to the device can be determined. Various actions on the device can be executed based at least in part upon a determined gaze direction of the user. In some embodiments, a display element of the device can turn off, and one or more inputs can be disabled, when the user is not looking at the device.

23 Claims, 10 Drawing Sheets

| | Looking At DE | Looking Near DE | Looking Away | Extended Away |
|---|---|---|---|---|
| Holding Device | All On | DE Dim | DE Off | DE Off |
| Device Face up | DE On, Certain Inputs Off | DE Dim, Certain Inputs Off | DE Off, Certain Inputs Off | DE Off, Certain Inputs Off |
| Device In Dark | DE On, Certain Inputs Off | DE On, Certain Inputs Off | DE Dim, Certain Inputs Off | DE Off, Certain Inputs Off |
| Random Movement Orientation | All On | DE Dim, Certain Inputs Off | DE Off, Certain Inputs Off | All Off |

FIG. 11

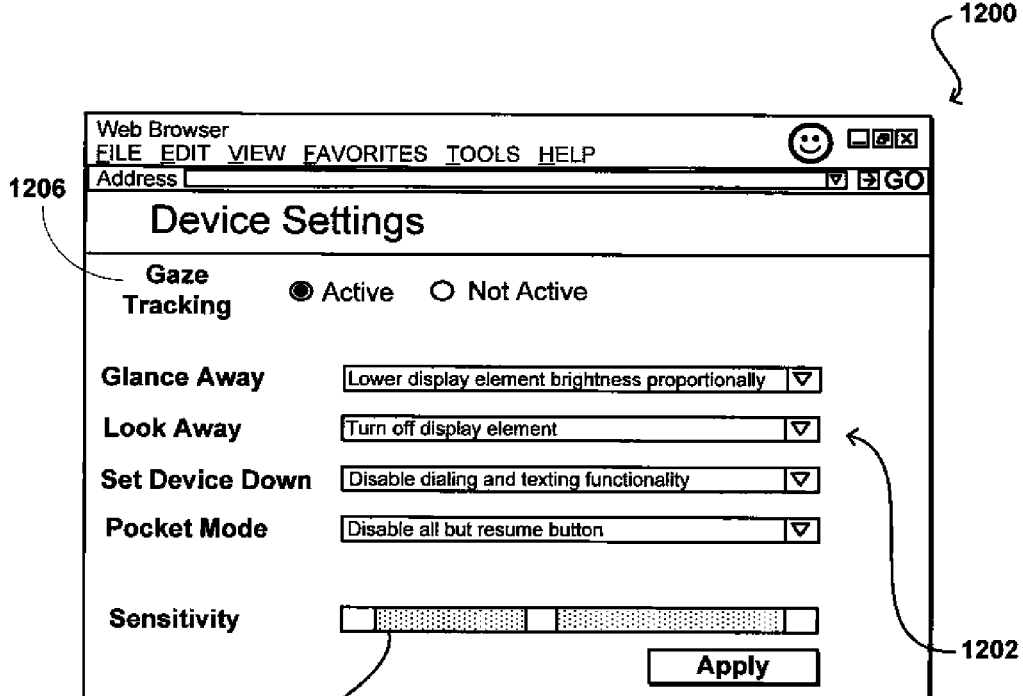

FIG. 12

ACTION BASED DEVICE CONTROL

BACKGROUND

As the variety of available computing devices increases, and as the size of many of these devices decreases, there comes a need to adapt the ways in which users interact with these computing devices. People increasingly utilize portable devices such as cellular phones, personal digital assistants (PDAs) and other electronic devices, which present different challenges than conventional stationary devices such as desktop computers. For example, portable devices typically are powered by a battery that has a limited operational time. For devices with large display elements or processor-intensive functionality, for example, usage can drain the batteries relatively quickly. Even for devices that can be plugged into a wall socket or powered using other conventional mechanisms, however, it still can be desirable to reduce the power consumption of these devices.

Certain conventional devices utilize various inactivity-based approaches, such as turning off a display of a cellular phone if a user does not interact with an input element such as a keypad, touch-sensitive display or roller ball for a determined period of time. Such an approach is not optimal, as the user can become frustrated if the display shuts off too quickly or while the user is viewing content on the device.

Further, users of devices such as smart devices and cellular phones often trigger undesired actions by inadvertently causing specific keys or other input mechanisms to be activated when placing the devices into a pocket, purse, backpack, etc. Any particular movement can cause an action to occur, such as a phone to dial an emergency number or a smart device to continually illuminate the display element. Thus, in addition to reducing power consumption, it can be desirable to limit the functionality of various devices in certain situations.

BRIEF DESCRIPTION OF THE DRAWINGS

Various embodiments in accordance with the present disclosure will be described with reference to the drawings, in which:

FIG. 11 illustrates example actions that can be taken in response to input combinations with respect to a computing device that can be used in accordance with various embodiments;

FIG. 12 illustrates an example of a display that can be presented to a user to customize device actions in accordance with one embodiment;

DETAILED DESCRIPTION

Figure 1:
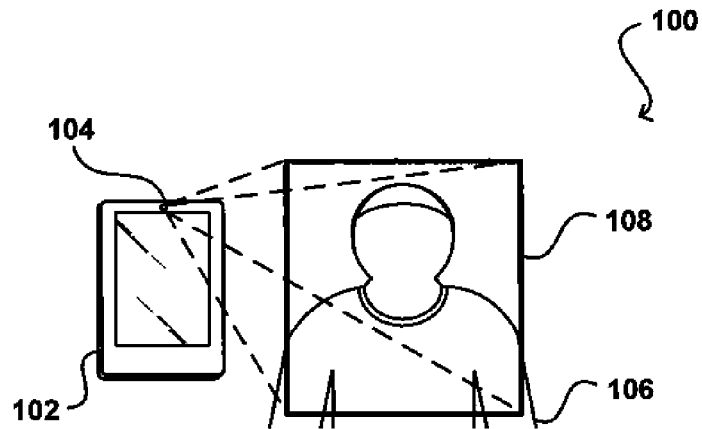
FIG. 1 illustrates an example of a portable device including an element operable to image the facial region of a user in accordance with one embodiment.

Systems and methods in accordance with various embodiments overcome many of the aforementioned deficiencies experienced in conventional approaches to controlling electronic devices. In one embodiment, an imaging element captures an image of a device user and determines which direction the user is looking relative to the device (referred to herein as "gaze direction"). The determined gaze direction of the user is used as input to control various aspects of the device, such as power and functionality. For example, if it is determined that the user's gaze direction is not toward the device, the display element may shut off and various device functions may be shut off, thereby reducing power consumption.

In addition to utilizing an imaging element to determine a user's gaze direction relative to the device, some embodiments described herein may also include additional elements, such as touch-sensitive elements, orientation determining elements and/or light sensing elements, that can assist in applying context to the user's determined gaze direction, which can assist in determining controllable actions to take with respect to the device. For example, the device may perform a first action when the user is not looking at the device but is holding the device and may perform a selected action when the user is not looking at, nor holding, the device.

In various embodiments, a computing device can include at least one display element. A user of the computing device will typically be facing the display element of the computing device during use, at least for specific applications or uses. The computing device can include, or be in communication with, at least one imaging element, such as a camera, detector or sensor, that can be positioned with respect to the device such that the imaging element is able to obtain images of at least a portion of the user while the user is operating the device. In one embodiment, a high speed, high resolution camera that is capable of capturing a large number of images in a small amount of time is utilized. The device can analyze image information obtained from the imaging element and determine at least one relative location or orientation of a user with respect to the device, as well as a gaze direction or field of view of the user. The image processing algorithm can also determine a change in the gaze direction with respect to the device.

In some embodiments, an imaging element of the computing device can include at least one infrared emitter and at least one infrared detector that can be positioned with respect to the device such that the device is able to obtain images of infrared radiation reflected from the user's eyes. The device can analyze image information relating to the relative size, separation and position of the user's pupils, for example, and can determine a gaze direction or field of view of the user with respect to the device. In one embodiment, the device utilizes continuous or periodic infrared illumination to monitor changes in gaze direction with respect to the device.

In various embodiments, an image processing algorithm is used to determine and monitor a user's gaze direction relative to the device in a series of obtained images and determine/identify the relative position and/or field of view of the user's eyes with respect to the display element and/or imaging element. Based on the determined gaze direction and/or field of view of the user's eyes with respect to the display element and/or imaging element, the algorithm can determine at least whether the user is looking substantially at, or away from, the display element. In another embodiment, the algorithm may further determine, based on the gaze direction and the field of view of the user's eyes with respect to the display element and/or imaging element, where the user is looking with respect to the display element, such as at a particular icon or even focused about a particular pixel or other display element. By tracking changes in the field of view/relative position of the user's eyes, the algorithm can determine at any time whether the user is looking at the device and, if so, where on the device the user is looking.

As illustrated in the example above, the functionality of the device can be altered based at least in part on the determined field of view, viewing position of the user, a change in gaze direction, etc. In some embodiments, the display element can have different brightness values, or even shut off, based at least in part upon whether the user is looking at, toward or away from the display element and/or device. That is, in such embodiments, the imaging element is used to provide input to control aspects of the device.

In other embodiments, various functionality or inputs of a device can be enabled/disabled, turned off or otherwise modified based at least in part upon the determined gaze direction of the user. For example, if it is determined that a user is not looking at the display element of the device but attempting to type a message using a touch-sensitive display element keyboard, instead of a conventional keyboard, the keyboard inputs may be modified to improve the user's typing ability. For example, the device may audibly present each key when selected by the user. In another example, the device may audibly present each key as the user positions their finger over/on the key prior to selection. In addition to audible presentation of key selections, the device may shut off the display element to conserve power.

Any number of device features and/or inputs may be controlled in accordance with the various embodiments described herein. For example, if it is determined that the user's gaze direction is not toward the device, or that the imaging element did not capture an image that includes the user's face, the device may disable inputs such as one-touch dialing in order to prevent inadvertent selection of such an input. In at least some embodiments, the user can configure which functions are enabled/disabled as well as define which functions require the user to at least look at the display element while performing certain actions.

Although the embodiments described above generally relate to managing power consumption and/or managing input to a device, embodiments can also be used to predict actions by a user in order to pro-actively initiate certain processes that can improve response time as well as prevent problems such as processor spikes or memory overruns. For example, a view monitoring algorithm can determine when a user is looking at a certain icon on a display element, such as an icon that is used to access documents from a hard disk. If the user looks at the icon for a minimum period of time, such as a fraction of a second, the device could cause the hard drive to spin up, which can reduce the amount of time needed to actually access a file subsequently selected by the user. If the user's eyes come to rest on an Internet icon, for example, the device could preemptively submit a request according to the home page of the browsing application on that device, so that the content loading process can begin before the user actually opens the browser. If a user looks toward an element to shut down the device, the device can begin powering down or closing unimportant components, applications and/or services, for example, which can reduce the length of the shut down process and conserve resources. If an animated advertisement is displayed on the display element, the animation may only be active when the device detects that that user is looking at the advertisement. Various other examples are described below with respect to the various embodiments.

Resources can be further conserved in various embodiments by reducing or eliminating unnecessary processing of instructions. For example, a user might be playing a game or viewing a detailed three-dimensional image on a device with a large display element. In at least some cases, the user's primary focus will be limited to a portion of that display element. For objects outside the primary focus region, the user will not be able to tell a significant difference between highly rendered characters or features and characters or features rendered with less detail. Various embodiments can track the user's gaze and can render certain portions of the display element in more or less detail based at least in part upon the determined gaze direction. By not rendering the entire display in high resolution, for example, the device can reduce the amount of processing power needed or can focus the processing power on rendering that portion of the display that will be most noticeable to the user. For three-dimensional displays, or other graphical interfaces, similar approaches can be used to render the information currently being viewed in a higher level of detail than other information contained within the area of the display element but not currently viewed, or at least focused on, by the user. In other embodiments, in addition to not rendering the entire display in high resolution, the system user can also interact with objects in that portion of the screen by tracking gaze direction to a specific portion of the screen. For example, if the user is playing a game, the user can interact with objects in the primary focus area by looking directly at those objects, such as shooting at enemies, picking up items, talking to other characters, etc.

In an example where a user is browsing items offered through an electronic marketplace, such as via a website of an e-commerce retailer, the user might view a number of items corresponding to a search request response or category of items. If the items are displayed in a three-dimensional grouping by category, for example, the device can render the items within the user's gaze differently than items outside the user's gaze.

In various embodiments, one or more additional inputs can be used to interpret, or enhance, information relating to the field of view or gaze direction of a user. For example, the device might include a level-determining element or accelerometer capable of determining an orientation, as well as movement, of the device. If it is determined that the user is not gazing at the device because the user moved the device, instead of the user looking away from the device, then the device might take a different action with respect to the display element, inputs, etc.

In other embodiments, the device can include touch-sensitive elements, over at least a portion of the device, such that the device can determine whether a user is currently holding the device. In such embodiments, the device can function differently if the user is holding the device but not looking directly at the display element, such as when the user is typing while looking elsewhere, than when the user is not looking at, or holding, the device.

In other embodiments, the device can include an element, such as a conventional light-sensing element, that is able to determine whether the device has been placed into a dark area, such as a pocket or briefcase. For example, if the user is not looking at the device and the light-sensing element detects that the device moves from a place with ambient lighting to an area where there is little to no light, the display intensity can be altered.

As discussed, many of the actions of a user with respect to a device can be detected using an image-based approach, which is able to determine a gaze direction, or field of view, of a user with respect to the device. FIG. 1 illustrates a configuration 100 in accordance with one embodiment wherein a portion of a user 106 operating a portable computing device 102 is imaged by an imaging element 104 of the portable device 102. It should be understood that the relative orientation of the user and the device shown in the figure is shifted for purposes of explanation, and that the user generally faces the side (e.g., front, back or other side) of the device that includes a display element and the imaging element 104. The imaging element 104 may be, for example, a camera, a charge-coupled device (CCD), a motion detection sensor or an infrared sensor, among many other possibilities. It should also be understood that, while a portable computing device 102 is depicted in this example, the portable device could be any appropriate device able to receive and process input commands, such as a personal computer, laptop computer, notebook, netbook, television set top box, cellular phone, PDA, electronic book reading device, video game system or portable media player, among others.

In this configuration, the imaging element 104 is on the same general side of the portable device 102 as a display element such that when a user is viewing information in the display element, the imaging element has a viewable area 108 that, according to this example, includes the face of the user 106. While in some embodiments the imaging element is fixed relative to the device, in other embodiments the imaging element can be operable to track the position of the user, such as by rotating the imaging element or an optical element (e.g. lens, mirror, etc.) that directs light to the imaging element. Although embodiments described herein use examples of the viewable area including the face of the user, the viewable area may include other portions of the body such as arms, legs and hips, among other possibilities. In either case, the viewable area 108 of the imaging element can be configured to obtain image information corresponding to at least a portion of a user operating the device. If the imaging element is continually (or at least substantially continually) capturing or otherwise obtaining image information, then any movement of the user 106 relative to the device 102 (through movement of the user, the device or a combination thereof) can cause a position or orientation of at least one aspect of that user (e.g., face or eye location) within the viewable area 108 to change. If the device includes software and/or hardware that is able to locate at least one such feature of the user that can be consistently determined, then the device can analyze the image information to manage functionality of the device over a period of time and utilize that relative motion as a source of input.

For example, a user can glance away from the portable device. Such motion can be detected and analyzed by the imaging element (e.g., camera) as the position of the user's eyes in the viewable area 108 will move in the images or may no longer be contained within the area of the captured images. Further, aspects such as the imaged shape, size and separation of the user's eyes also can change as discussed elsewhere herein.

A change in eye position in the viewable area could also be accomplished by moving the device up and down while the user remains still, as well as through other such motions. In some embodiments, the device is able to distinguish between movement of the user and movement of the device by detecting movement of a background or other aspect of the images or by analyzing the separation, shape or size of various features. Thus, in embodiments described anywhere in this description that use the imaging element to determine an orientation of the device relative to its user, the tracking of information such as gaze direction can account for movement of the device, such that a change in gaze direction due to movement of the device relative to the user can be accounted for without inadvertently registering the change in gaze direction as a new input value, etc.

Figure 2:
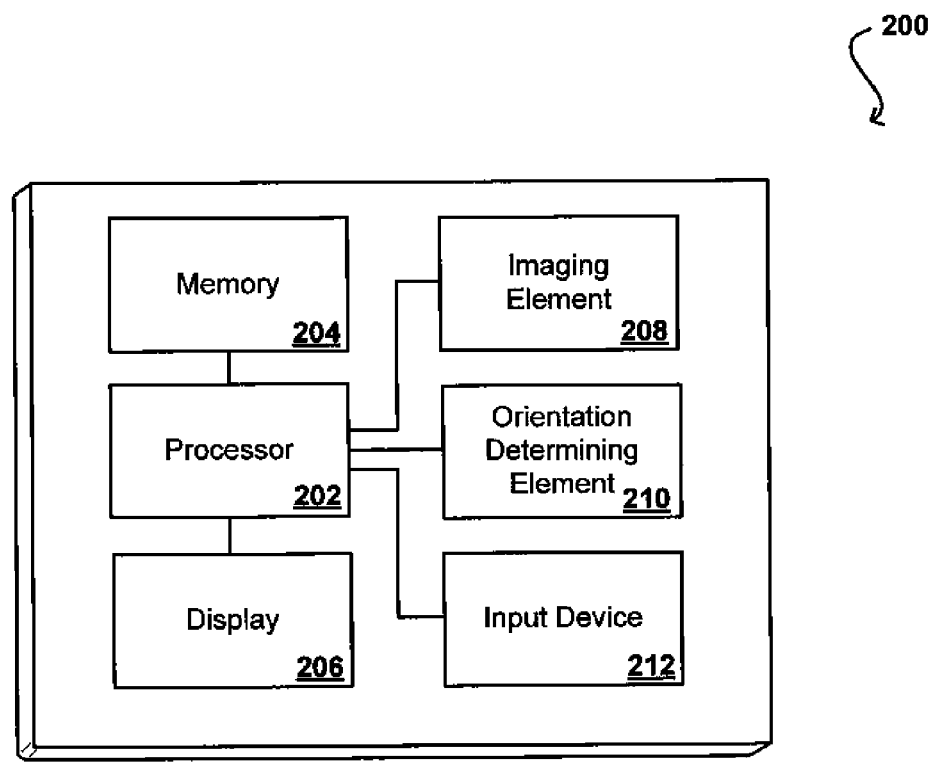
FIG. 2 illustrates components of a controllable device that can be used in accordance with one embodiment.

FIG. 2 illustrates a set of basic components of an example computing device 200 such as the device 102 described with respect to FIG. 1. In this example, the device includes a processor 202 for executing instructions that can be stored in a memory device or element 204. As known in the art, the device can include many types of memory, data storage or computer-readable media, such as a first data storage for program instructions for execution by the processor 202, a separate storage for images or data, a removable memory for sharing information with other devices, etc. The device typically will include some type of display element 206, such as a liquid crystal display (LCD), although devices such as portable media players might convey information via other means, such as through audio speakers. As discussed, the device in many embodiments will include at least one imaging element 208 such as a camera that is able to image a facial region of a user. The imaging element can include any appropriate technology, such as a CCD imaging element having a sufficient resolution, focal range and viewable area to capture an image of the user when the user is operating the device. Methods for capturing images using an imaging element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application or other device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element 210 that is able to determine a current orientation of the device 200. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

In some embodiments, the device can include at least one additional input device 212 able to receive conventional input from a user. This conventional input can include, for example, a push button, touch pad, touch-sensitive element used with a display, wheel, joystick, keyboard, mouse, keypad or any other such device or element whereby a user can input a command to the device. Some devices also can include a microphone or other audio capture element that accepts voice or other audio commands. For example, a device might not include any buttons at all, but might be controlled only through a combination of visual and audio commands, such that a user can control the device without having to be in contact with the device. As will be discussed later herein, functionality of these additional input devices can also be adjusted or controlled based at least in part upon the determined gaze direction of a user or other such information.

Figure 3:
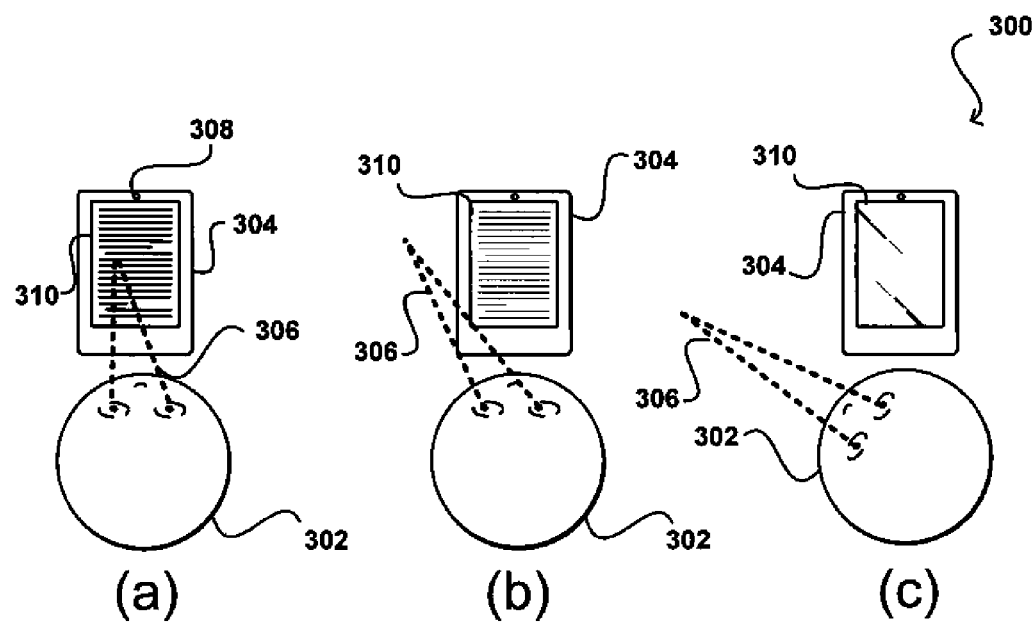
FIGS. 3(a)-3(c) illustrate approaches to altering the state of a display element based on the gaze direction of a user that can be used in accordance with one embodiment.

FIGS. 3(a)-3(c) illustrate an example situation 300 wherein a determined gaze direction of the user is used to control an aspect of a device in accordance with at least one embodiment. In this example, an aspect of the display element is adjusted based on whether the user is looking at the display element 310 or elsewhere. In FIG. 3(a), the user 302 is positioned in front of an imaging element 308 of a computing device 304. The imaging element 308 is able to capture images of the user 302 during operation of the device, and instructions on the device enable at least one processor to determine a gaze direction 306 of the user with respect to the device 304. Based at least in part upon the determined gaze direction, the processor can manage an aspect of the display element 310, such as to control a brightness of an LCD display or the display of characters on an electronic paper display.

In FIG. 3(a), the device determines that the gaze direction 306 of the user is such that the user is looking at the display element 310 of the device 304. In this embodiment, the display element 310 is activated so that the brightness, contrast and/or other such elements enable the user to readily view the displayed content. The device can track changes in the gaze direction 306 of the user while the user interacts with the device 304, such as when the user adjusts gaze direction 306 to read information on the display element 310, looks toward a keypad (not shown) to type information or performs another action. In some embodiments, as long as the user is looking at the display element 310 or at least substantially looking at the device 304, the display element can maintain its active settings.

In FIG. 3(b), the device 304 detects that the user 302 is substantially facing the device but is glancing away from the display element 310 and/or device. In some embodiments, the display element can be shut off whenever the user is not looking at the display element and/or device. When the user is facing the device, however, the frequent turning on and off of a display element (particularly a backlit device such as an LCD display) each time the user looks slightly away can in some cases be distracting or even annoying to the user and can potentially degrade the user experience. In this embodiment, if a user is still facing the device such that the display element is still likely in at least the peripheral view of the user, the display element may enter an intermediate state, or other such state, wherein at least one aspect of the display element is adjusted to reduce the power consumption attributable to the display element.

In some embodiments, a brightness or contrast level of the display element can be adjusted to a lower level when the user is facing the display element but glancing away or even when the user faces away from the display element for a short period of time, such as under a selected threshold amount of time (e.g., less than a second or two). In other embodiments where aspects of the display element are sufficiently variable, the brightness, contrast and/or other aspects of the display element can be adjusted by an amount that is proportional to the distance of the gaze direction 306 from the display element and/or device. For example, as the gaze direction of the user moves away from the display element, the brightness level of the display element can begin to decrease. As the user looks further away from the display element, the brightness level can continue to decrease. At some point, such as a threshold distance, the user's gaze direction can be sufficiently far away from the display element that the display element will drop to a minimum brightness value, shut off, go into a sleep mode or perform a similar action that minimizes or eliminates the power consumption attributable to the display element when the user is looking at least a threshold distance away. In embodiments where each pixel of a display element is illuminated individually, the device can reduce the resolution of the display element, or dim at least some of the pixels, in order to save power. As described above, the threshold and functions can be selected/defined by each user.

In another embodiment, content may be also be modified when the user is facing the display element but glancing away or even when the user faces away from the display element for a short period of time, such as under a selected threshold amount of time (e.g., less than a second or two). For example, if the display element is rendering video, animation or any other form of moving/multimedia content, as the gaze direction of the user moves away from the display element, the moving or animated content on the display element may be paused until the user returns their gaze direction to the display element. Pausing the rendering of moving content saves power and enables the user to glance away from the display element and resume viewing where they were once their gaze returns to the display element.

In FIG. 3(c), the device determines that the user is not facing the device 304, or at least is looking a threshold distance away. In some cases the user's eyes will not appear (or be detected) in the images captured by the device. In other cases, the user's gaze direction can be determined to be sufficiently away from the device to adjust the display element to a reduced state, such as to power off the display element. As should be understood, however, as the user's gaze direction returns towards the display element, the display element can either power up completely or can adjust aspects (e.g., increase brightness or contrast) proportionally as the gaze direction returns toward the display element.

In order to properly adjust the display element parameters based upon user gaze direction, it can be necessary in at least some embodiments to calibrate the device with respect to the user. For example, users will have different eye sizes, separations and other physical differences. Further, users can hold the same device at different distances and at different orientations with respect to the user. The relative orientation also can depend at least in part upon the task being performed by the device, as a user typically will hold or position differently when viewing a movie than when texting or working on a spreadsheet, for example.

In one embodiment, a user can be asked to go through a calibration procedure each time the user powers on the device, opens an application on the device or performs a similar action. For example, a user could be asked to look at each of a number of targets on a display element, such as at each corner, whereby the device can detect relative positions of the pupils to the eyes of the user for different locations on the display. Once information is obtained for specific gaze directions, other gaze directions can be interpolated using the initial calibration information. If the device is not tracking the gaze direction properly, the user can have the option of recalibrating such as by selecting a recalibration option on the device.

Figures 4A, 4B:
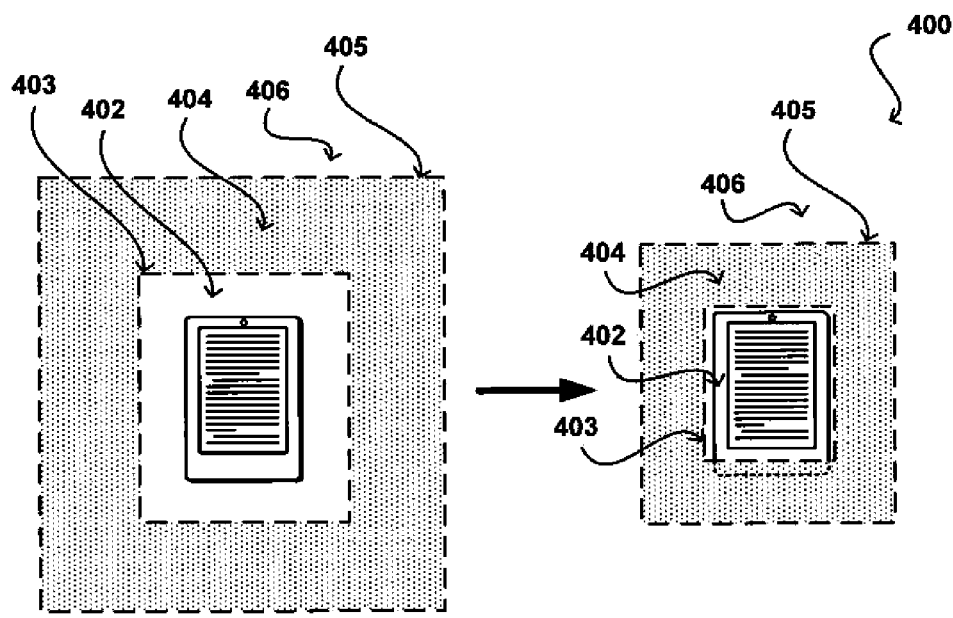
FIGS. 4(a)-4(b) illustrate approaches to automatically calibrate gaze direction determinations with respect to a computing device in accordance with one embodiment.

For certain embodiments, users or applications, however, such a calibration procedure might not be desirable or could degrade the user experience, particularly where the user has to recalibrate the device each time the user activates, or performs a specific action with respect to, the device. Accordingly, FIGS. 4(a)-4(b) illustrate an example calibration procedure 400 that can be used in accordance with various embodiments. In this embodiment, it can be assumed that a user turning on a device will be glancing at the display element within an initial time period of turning on the device. In other embodiments, past or default calibration information can be used as a starting point as soon as a user's eyes are detected by the camera, and it is determined that the user is likely looking at the display element. In some embodiments, the device associates and stores the calibration information with a recognition of the user that is generated from an image of the user. Thus, once calibrated for a user, when the user interacts with the device, the device will recognize the user and utilize the stored calibration information. This embodiment provides the ability for multiple users to interact with the device, each having different settings and calibration information.

FIG. 4(a) illustrates three different zones, a first zone 402, with a boundary 403, where the user is determined to be gazing or looking substantially at the display element, a second zone 404 where the user is determined to be gazing or looking away from the display element but still substantially facing the device and a third zone 406 where the user is determined to be substantially gazing or facing away from the device, such as may be defined by a maximum gaze direction boundary, or second boundary 405, at the outer edge of the second zone. It should be understood that additional or fewer zones could be used in other embodiments, such as two zones which cause the display element to be either on or off. Initially, when a user powers up the device or performs a similar action, the device can at some time detect the user's eyes and can determine that the user is likely looking toward the device. The device can then begin tracking the user's gaze with respect to the device. Because the device has not calibrated the user's relative position, features, etc., the device can allow for a relatively large range of eye movement before adjusting the display element settings or other inputs. For example, the first boundary 403 and second boundary 405 used to adjust parameters of the display element can be set to be sufficiently far from the device such that the device is unlikely to improperly interpret the gaze direction of the user. Since the eye separation, size and shape of a user will fall within a given range, the device can use a default zone boundary (or threshold, etc.) that will be used to adjust display element parameters and/or other inputs such that no typical human would be viewing the display element if determined to be looking beyond the first boundary 403.

As the device tracks the movement of the user's eyes over time, the device can begin to adjust (e.g., shrink) the size of the zones by decreasing the first boundary 403 and second boundary 405 or reducing the distance from the display element at which the user's gaze direction can cause the parameters of the display element to be adjusted. For example, a user interacting with the device will look primarily at the device display element as well as other inputs or components of the device. By monitoring the view position of the user interacting with the device, the device can approximate the outer edges of the device with respect to the user's gaze position. For example, if the user is reading a book on an electronic book reader, the user will scan almost the entire display element with a significant number of the pages. By tracking the user's gaze position for each page, the device can automatically calibrate the user's gaze direction and can update that calibration information as it changes, as may be due to the user shifting position, etc. Further, if a user is typing on a touch-sensitive display element, then the device can reasonably interpret the user's gaze to be looking at the characters and/or text being entered. Various other activities can be correlated with gaze direction or viewing location as should be apparent in light of the teachings and suggestions contained herein.

FIG. 4(b) illustrates a second view of the calibration zones after monitoring the user's gaze direction for a period of time. In this example, it can be seen that the first boundary 403 surrounding the first zone 402 where the user is determined to be substantially looking at the display element has been reduced to approximately the size of the display element, with a little extra expansion to account for small variations, movement, drift, etc. The second boundary 405, surrounding the second zone 404, has also been reduced such that the display element can adjust and/or turn off more quickly or respond better to smaller detected movements. It should also be understood that other aspects of the zones can change as the calibration of the device becomes more accurate, as the zones can change in any of shape, number, size corresponding action or other such aspects, within the scope of the various embodiments. Similarly, the calibration can learn habits or characteristics of the user. For example, when a certain user is typing a response to a difficult question from his manager, the user may always look up and to the right before sending the response. Rather than dimming the screen when this user looks up and to the right, the device display would remain in the active state for the user's selected period of time.

Figure 5:
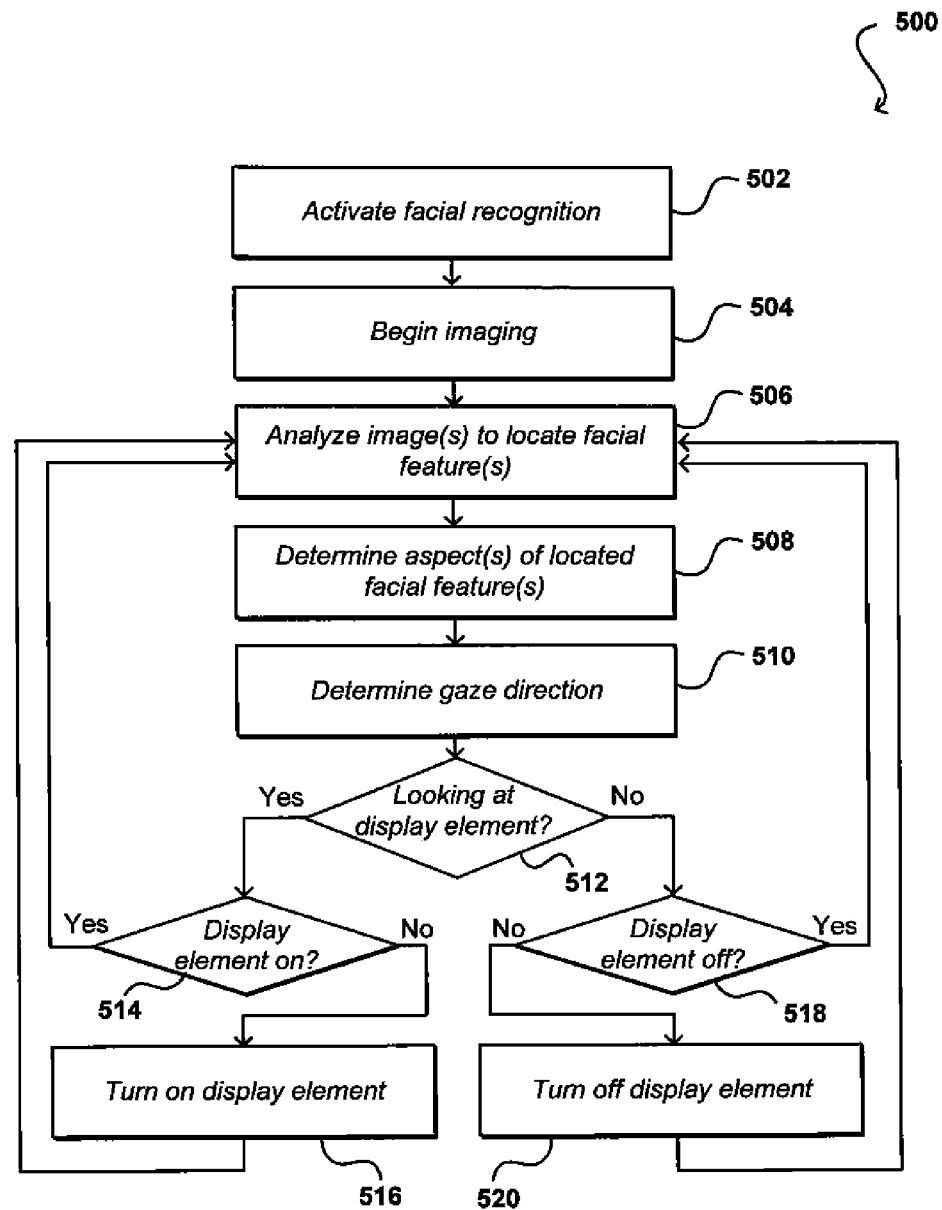
FIG. 5 illustrates an example process for adjusting a display element in response to detected changes in gaze direction that can be used in accordance with various embodiments.

Once a default calibration has been selected, or calibration information has been obtained, the gaze direction of a user can be used to control the display element or other functions of the device, as discussed herein. As an example, FIG. 5 illustrates a process 500 that can be used to turn on and turn off a display element of a device in accordance with various embodiments. In this process, a facial recognition mode (or similar mode) of the device is activated 502 using approaches such as those discussed herein. In some instances this might occur automatically at startup, and in other instances this might require first receiving an activation request on behalf of the user. An imaging element of the device begins to obtain image information corresponding to the viewable area of the imaging element 504, and the images are analyzed to locate at least one desired facial feature of the user 506. In some cases, this process might require analyzing one or more images, or a stream of images, to locate features such as the eyes of the user. Once appropriate facial features of the user are located within an acceptable degree of certainty, various aspects of those facial features are determined 508. For example, if the features include a user's eyes, an algorithm can determine the dimensions of each eye, the separation, the relative position with respect to the face, distance from the nose or other such aspects, such that a change in orientation can be detected. In other embodiments, this can further include information such as dimensions of the user's pupils and relative positions with respect to the eye positions, such that a change in gaze direction can be determined. Based at least on the determined aspects, an initial gaze direction or view location of the user with respect to the device is determined 510. In some embodiments, a device might require a user to face the device during an initial calibration period. In other devices, such as where user information is stored, the device can capture a single image and analyze the information to determine a relative orientation by comparing measured aspects from the image with stored aspect information for the user.

Once the initial field of view is determined, image information can be analyzed continually (or periodically) in order to monitor variations in the determined aspects of the facial features. For example, each captured image (or a subset thereof) can be analyzed to determine whether the user is looking at the display element 512, such that the user's view location is substantially within a region (or other such area) of the display element of the device. If the user is looking at the display element, a determination can be made as to whether the display element is currently on, illuminated, activated, etc. 514. If the display element is not on, the display element can be turned on or otherwise activated 516 and monitoring can continue. In some cases, state information can be stored for the display device such that the device does not need to continually determine whether the display element is activated. Various other such approaches can be used as well within the scope of the various embodiments.

If it is determined that the user is not looking at the display element, a determination can be made as to whether the display element is currently in an off (or other less than fully active) state 518. If the display element is off, monitoring can continue. In some embodiments, an extended period of inactivity can cause other actions, such as the powering down of the entire device. If the display element is on, the display element can be turned off 520 or otherwise moved to a state that conserves power and monitoring can continue. As discussed, orientation information from an orientation detection element such as an accelerometer can also be used to make determinations as to user gaze direction or other such aspects.

Figure 6:
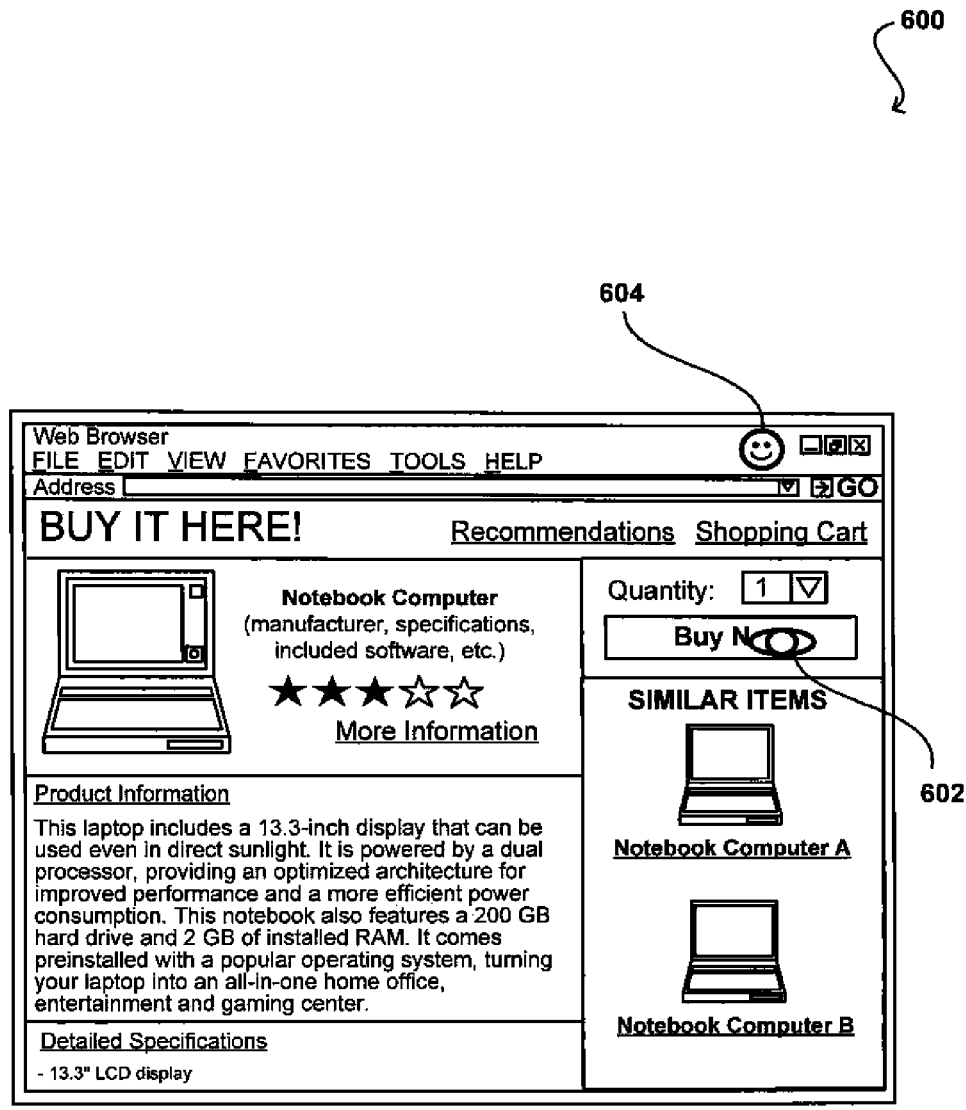
FIG. 6 illustrates an example of a display that can be generated to assist in recalibrating gaze detection in accordance with one embodiment.

In order to accurately determine field of view over time, such that actions involving the display element and other elements/functions can be performed at appropriate times, it can be desirable to update calibration of the device with respect to the user to account for changes in position, separation, etc. One such approach that can be used to update calibration information in accordance with various embodiments is illustrated with respect to FIG. 6. In this example, a display page 600 is illustrated that could be rendered in a browser or other application on a display element of a computing device. In this example, a field of view icon 602 or other indicia is displayed on the display element during a calibration period when the device is unsure of the calibration information or otherwise needs to refine the calibration information. In this embodiment, the icon 602 can appear when a user's gaze is first detected by the device. As part of the user's natural reaction and/or as part of the instructions given to a user, the user can attempt to look at the icon when it appears on the display element. If the icon is not in the correct position that corresponds to the user's gaze, the user's gaze direction will move towards the icon. In some embodiments, the icon can stay in a fixed location until the user's gaze rests upon the icon, and the calibration information can be adjusted accordingly. In other embodiments, the user can continue to perform various actions, without having to stop and stare at the icon, and the icon can be repositioned by the system to follow the user's eye movements. The icon can "float" with respect to the user's gaze position, such that as the user's gaze direction moves to the right, the calibration information can adjust as the icon nears an edge of the display element or other location. For example, a substantially transparent icon (such that the user can see what is displayed "beneath" the icon) can appear that moves where the device thinks the user is looking. As the user moves gaze direction around the display element, particularly near edges, the icon position can adjust accordingly. For example, if the icon is near the right edge of the display but the user keeps moving the gaze direction to the right, then the calibration information can be updated to compensate for the difference. Once the gaze direction is calibrated sufficiently, the icon can be removed until the calibration procedure is determined to require recalibration.

In some embodiments, the user can turn the gaze tracking functionality on or off, such as may be represented by a graphic 604 or other element indicating that gaze tracking is active. In some embodiments, the user can look at (or otherwise select) the graphic to activate the tracking icon 602 and update the calibration. As discussed, in some embodiments, the tracking icon is a semi-transparent icon that allows a user to see what is behind the icon while still knowing the position of the icon. In another embodiment, the icon is only visible (briefly) when the user performs a quick and/or large eye movement, such as by looking up at the top of the display, in order to communicate to the user whether calibration is still adequate. In another example, the icon is only displayed when the user is looking at a specific element, such as the tracking graphic 604, to indicate that calibration is occurring. Various other options can be used as well within the scope of the various embodiments.

Figure 7:
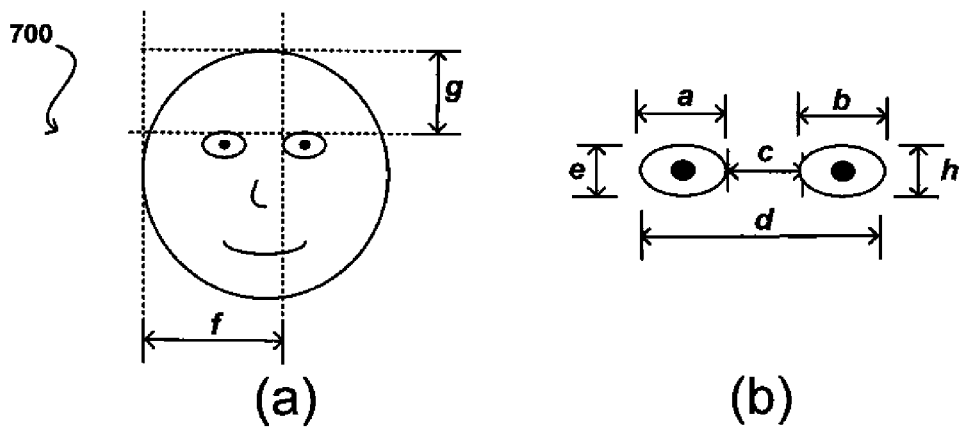
FIGS. 7(a)-7(b) illustrate analysis of facial features of a user in accordance with various embodiments.

Algorithms for determining the gaze direction of a user with respect to the computing device can use any number of different approaches. For example, FIG. 7(a) illustrates an image of a face 700 of a user of a device as could be captured (e.g. obtained, imaged) by an imaging element of the device. Thus, the face 700 is depicted as perceived by the imaging element of the device. As can be seen in FIG. 7(a), and also in the eye-specific view of FIG. 7(b), there are various aspects of the user's face that can be located and measured, such as the perceived width and height of a user's eyes, the perceived relative separation of a user's eyes and the perceived relative position of the user's eyes to an edge of the user's face when facing the device. Any number of other such measurements or aspects can be used as should be apparent. When a user tilts or translates the device, or moves his or her head in any direction, there will be a corresponding change in at least one of these measured aspects in subsequent images that are obtained. For example, if the user tilts his or her head right or left, the horizontal distance f in FIG. 7(a) between the user's eyes and an edge of a side of the user's face will change. In a similar manner, if the user tilts his or her head up or down, the vertical distance g between the user's eyes and an edge of the top of their head will change. Further, the shape or horizontal measurements a and b and the shape or vertical measurements e and h of the user's eyes will change and can change by different amounts. The separation distance c between the eyes can change as well. Using such information, the device can determine a type of motion that occurred and can use this information to help interpret the movement of the user's pupils or other such information.

Figure 8:
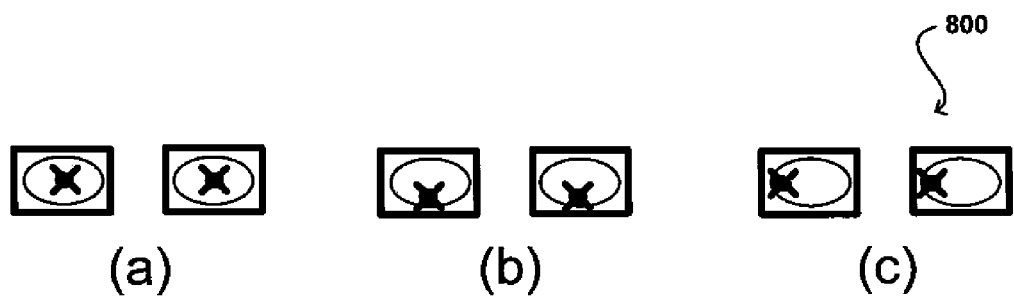
FIGS. 8(a)-8(c) illustrate an example of capturing eye movement of a user as input in accordance with one embodiment.

For example, FIGS. 8(a)-8(c) illustrate the movement of a user's pupils with respect to the user's eye position. In some embodiments, the user's pupil position relative to the user's eye position can be at least partially indicative of the gaze direction of the user. For example, assuming the user is facing toward the device, in FIG. 8(a) the user is gazing forward, while in FIG. 8(b) the user is gazing downward and in FIG. 8(c) the user is gazing to the left (in the figure). Such information by itself, however, may not be sufficient to determine gaze direction. For example, if the user had tilted his or her head up (or back) while making the pupil movement in FIG. 8(b), the user might actually be looking forward (or even 'up' relative to the previous position). Further, if the user translates his or her head to the left or right in FIG. 8(a), but does not adjust the position of the pupils with respect to the user's eyes, then the viewing location would actually change even though the user is still looking straight ahead. Thus, in certain embodiments, it can be advantageous to utilize the facial measurement approaches discussed with respect to FIGS. 7(a)-7(b) to interpret the pupil movements of FIGS. 8(a)-8(c).

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

In some embodiments, the accuracy of the image capture and detection can be such that gaze direction and/or field of view can be determined based substantially on pupil-related information. In one embodiment, image analysis can be performed to locate the position of the user's pupils. The dimensions of the pupils themselves, as well as position and separation, can be indicative of changes in the user's gazing direction. For example, in addition to determining that pupils move from left to right in adjacently-captured images, the device can determine, due to small changes in the width of each pupil, whether the user position with respect to the device has translated. Similarly, the device can determine whether the user rotated his or her eyes, which would result in changes in diameter since the eyes are spherical and changes in rotation will result in changes in the captured dimensions. By being able to precisely measure pupil-related dimensions, the device can track the field of view of the user with respect to the device.

Another benefit to being able to accurately measure pupil-related dimensions is that the device can also determine a focus depth of the user. For example, if the user focuses on a point "farther away" from the user, the device can detect a change in separation of the pupils. Because the device can also measure the dimensions of the pupils in the image, the device can also determine that the increase was not due to an action such as a decrease in the distance between the user and the device. Such information can be useful for three-dimensional images, for example, as the device can determine not only a viewing location, but also a depth at which the user is focusing in order to determine where the user is looking in three-dimensional space.

While user information such as pupil measurements can be determined through various image analysis approaches discussed above, conventional image analysis algorithms are relatively processor-intensive and can require a significant amount of memory. Conventional portable devices, such as cellular phones and portable media players, might not have the necessary resources to perform such real-time image analysis, particularly at the resolution needed to detect small variations in pupil diameter. Further, in order for the image capture to work there must be a sufficient amount of ambient light, such that if a user is reading an electronic book on a device with a display such as an electronic paper display that does not generate significant illumination as would an LCD or similar display element, there might not be enough light to adequately capture the necessary image information.

An approach that can be used in accordance with various embodiments instead utilizes infrared (IR) radiation to illuminate at least a portion of the user and capture the reflected radiation. A particular advantage of IR radiation is that the human retina acts as a reflector with respect to IR, such that light from a given direction will reflect back in substantially the same direction but will not reflect back in a substantially different direction. This effect is similar to a red-eye effect in an image, where an image captured using a flash attached to the camera can experience the red-eye effect, but images captured from cameras at other angles with respect to the flash will not demonstrate the red-eye effect.

Using such an approach, a user can be illuminated with infrared radiation from the device, such as by including at least one infrared emitter in the device that will emit infrared radiation that is not harmful to the user and further cannot be detected by the user during use. The device also can include at least one infrared sensor for detecting infrared radiation reflected by the user. One advantage of such an approach is that the IR components can be relatively low-power, relative to illuminating a user with ambient light. Further, the images captured can have a relatively low color depth, similar to a grayscale image, such that much less processing capacity is needed than for analyzing full-color image analysis. In other embodiments, different techniques may be utilized to determine the gaze direction of a user.

Figure 9:
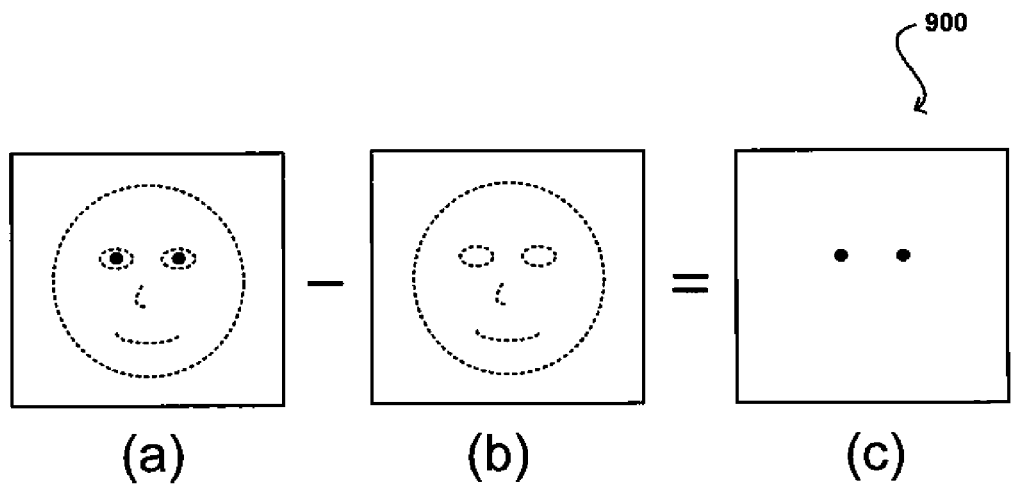
FIGS. 9(a)-9(c) illustrate an approach to determining retina location from a pair of images that can be used in accordance with one embodiment.

FIGS. 9(a)-9(c) illustrate an example process for determining pupil or retina parameters using infrared radiation that can be used in accordance with various embodiments. In this example, a first image is shown in FIG. 9(a) that was captured using a sensor positioned near an infrared source, such that each retina reflects the infrared radiation. FIG. 9(b) illustrates another image captured using a sensor positioned away from an infrared source, such that any IR radiation reflected by the retinas is not directed to, or detected by, the sensor. Thus, as can be seen, the major significant difference between the two images is the reflection by the retinas. Using simple image comparison or subtraction algorithms, for example, the retinas can quickly be extracted from the images. If noise is sufficiently filtered out, using any appropriate method known in the art, the resultant image in FIG. 9(c) will include substantially only the reflection from the retinas, which can quickly be analyzed with very little resource allocation.

In order to accurately match the images, the images should be captured simultaneously or with little time between captures in order to minimize the effect of user and/or device movement. Further, in cases where there are two IR sensors positioned at different locations on the device, as is discussed elsewhere herein, image matching or rectifying algorithms can be used to adjust for offsets in the images due to the different capture positions. Various calibration or other such processes can be used as known in the art for matching the position of items captured from slightly different positions and/or angles.

As with the analysis of conventional full-color images described above, however, the resolution of the IR-based approach described above might not be sufficient to track gaze direction or field of view for all applications. In such cases, it can be beneficial to utilize additional input mechanisms and/or additional IR emitters and detectors to help interpret or enhance the captured information. At least some of these additional elements shall be referred to herein as "environment-determining input elements," as the additional elements are operable to determine at least one aspect relating to the environment surrounding the device, such as light or noise surrounding the device, a relative orientation of the device to the surroundings, whether a user is holding the device, etc. While use of IR emitters and detectors are described herein, any type of facial or movement recognition technique may be used with the embodiments described herein.

Figure 10:
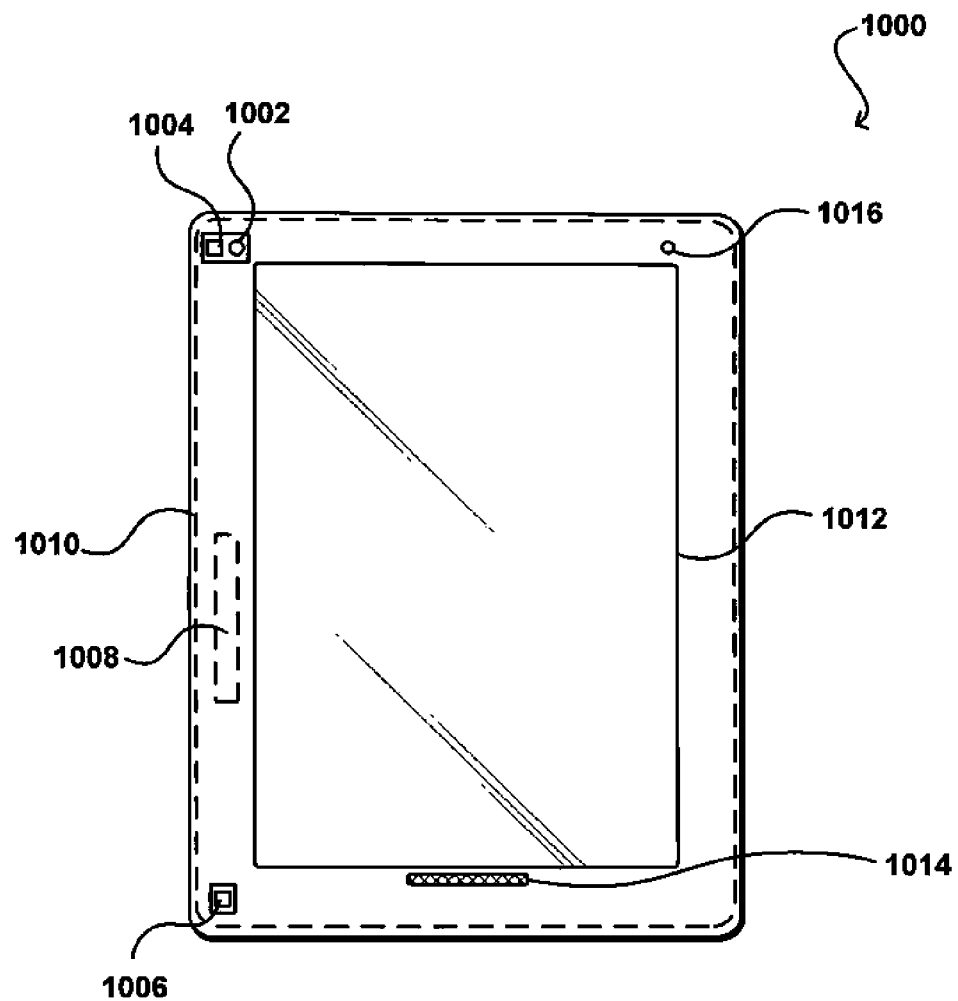
FIG. 10 illustrates an example computing device that can be used in accordance with various embodiments.

As an example, FIG. 10 illustrates an electronic computing device 1000 that can be used in accordance with various embodiments. This example includes a display element 1012 and an orientation-determining element 1008, such as an accelerometer, which can be used to help interpret motion in a captured image using various approaches described herein. As discussed, the device also includes an image capture element for capturing image information about the user of the device. While the device in FIG. 1 included a camera for capturing full-color images, this example device includes an IR emitter 1002 and two IR detectors 1004, 1006 (although a single detector and two emitters could be used as well within the scope of the various embodiments). In this example, a first IR detector 1004 is positioned substantially adjacent to the IR emitter 1002 such that the first IR detector will be able to capture the reflected infrared radiation from the user's retinas. The second IR detector 1006 is positioned a distance away from the IR emitter 1002 such that the detector will not detect any reflected radiation due to the IR emitter. The emitter and detectors can be positioned on the device in locations that are least likely to interfere with the user's operation of the device. For example, if it is determined that average users hold the device by the middle of either side of the device and primarily on the right side or on the bottom of the device, then the emitter and detectors can be positioned at the corners of the device, primarily on the left-hand side or top of the device. In another embodiment, there may be additional IR emitters (not show) positioned on the device that transmit IR at different frequencies. By detecting which frequencies are received by the detectors, the device can determine specific information as to the orientation of the users gaze.

As discussed, using multiple input mechanisms can help to interpret information captured about the user, such as the movement of a user's pupils or other features. Further, additional input devices can allow for the determination of actions in addition to changes in gaze direction, which can be used to control other aspects of the device as well. These other controllable aspects can relate to conservation of power consumption and other such resources within the scope of the various embodiments.

For example, the device can include a touch-sensitive element 1010 around at least a portion of the device 1000. For example, a material similar to that used with a touch-sensitive display element can be used on the back and/or sides of the device. Using such material, the device is able to determine whether the user is actively holding the device, in addition to whether the user is looking at, or away from, the device. Such information could be used with the gaze information to determine how to adjust the display element. For example, in some embodiments, the display element might be configured to go into a mode with lower contrast or brightness when the user is not looking at the display element but is still holding the device. The display element might only turn completely off if the user is not looking at the display element and not holding the device.

In addition to determining whether the user is holding the device, through use of the touch-sensitive element, the system can determine what portions of the device are held/covered by the user. In such an embodiment, multiple IR emitters may be positioned on the device at different locations, and based on where the user is holding the device (i.e., which IR emitters are covered vs. not covered), the system can determine which IR emitters to use when capturing images.

The ability to determine such user information can also be used to adjust functionality of other elements of the device as well. For example, the device can include a number of input buttons or keys (not shown) that can be used for purposes such as to input characters, activate voice dialing, dial emergency numbers or perform any of a number of other such functions. If a user is not holding the device, at least some of these inputs and/or actions might be disabled in order to prevent the user from inadvertently activating one of those functions, such as by accidentally pressing one of the buttons when placing the device in a bag or pocket, dropping the device, etc. Further, in devices where the keypad is illuminated, the keypad lighting can be turned off when the device is not being held by the user and can be turned back on when the user picks up the device, which can be detected by a combination of the touch-sensitive element and orientation-determining element(s), for example.

The example device in FIG. 10 also includes a light-detecting element 1016 that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available.

In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Further, a light-detecting sensor can help the device compensate for large adjustments in light or brightness, which can cause a user's pupils to dilate, etc. For example, when a user is operating a device in a dark room and someone turns on the light, the diameters of the user's pupils will change. As with the example above, if the device includes a display element that can operate in different modes, the device may also switch modes based on changes in the user's pupil dilation. In order for the device to not improperly interpret a change in separation between the device and user, the light detecting sensor might cause gaze tracking to be temporarily disabled until the user's eyes settle and a recalibration process is executed. Various other such approaches to compensate for light variations can be used as well within the scope of the various embodiments.

The device may also include a distance or range detector that determines the distance between the device and the user. When a change in distance beyond a predefined threshold is determined, the font of the device may be altered or the display element shut off. For example, if the distance between the user and the device increases beyond a specified threshold, the rendered font size may automatically increase or be rendered with a higher contrast to make viewing easier. Likewise, if the distance between the device and the user decreases, the font may automatically decrease in size. If however, the distance between the device and the user exceeds a second threshold (e.g., the user is no longer detected), the device or the display element may shut off.

The example device 1000 in FIG. 10 is shown to also include a microphone 1014 or other such audio-capturing device. The device in at least some embodiments can also determine various actions based upon sound detected by the microphone. For example, the device might be able to determine from the detected sound whether the microphone is up against a material, which might cause sound to be muted or otherwise distorted. If the device is in a pocket or bag, for example, the microphone might be significantly covered by a material, which can affect the quality of sound recorded. In some embodiments, the device might emit (periodically or continually) a sound that is not perceptible to humans, but that can be detected by the device. In this way, the device can determine whether it is likely in a location that cannot readily be accessed by a user, such that certain functionality can be disabled. In some embodiments, the sound might only be emitted when the device is attempting to determine a present location of the device. In some embodiments, the sound emitted might be perceptible to a human, but would only be emitted when the device is attempting to determine whether to shut down certain functionality. In some embodiments, the device might emit (and record) a noise when a certain button is pushed, for example, to determine whether a user likely pushed the button or whether the button was likely accidentally pressed by something in the surrounding container, etc.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

There can be any of a number of functions performed based upon any of a number of user actions detected with respect to a device. As a simple example, FIG. 11 illustrates a table 1100 of situations that can each have specific actions taken for a single device. In this example, different actions can be taken based on whether a user is determined to be looking at the display element of a device (referred to in FIG. 11 as "DE"), looking near the display element or device, looking substantially away from the device or looking away from the device for an extended period of time. For each of these situations, there can be different actions taken that are based at least in part upon input from other elements of the device. For example, if the user is holding the device but the user is looking away from the device, the display element might turn off but all other input functionality might remain active. If the device is facing up but at rest, the device might have different actions specified than if the device is moving randomly or is in the dark. As should be understood, the table can have many more dimensions, as there could be specific actions taken for combinations of more than two of these and other such situations.

Further, the action taken can depend at least in part upon an application or other function executing on the device. For example, if a user is playing/displaying a video file on the device, then the display element might not shut off if the user is not holding the device or sitting directly in front of the device, such that the user's gaze direction is detected. If the user is only listening to audio, however, the device might power down the display element and disable other functions if the user is not looking at the display element or holding the device. If the user has a word processing application open, but is not holding or looking at the device, many functions of the device might power down until the user again interacts with the device. Various other situations and actions are possible within the scope of the various embodiments.

In some embodiments, these functions can be at least partially configurable by a user of the device. For example, FIG. 12 illustrates an example of a configuration display element 1200 that could be displayed to a user of the computing device. In this example, the user is able to enable/disable functions, such as gaze-based display element activation 1206 and interaction-based function control. For example, the user can be presented with several options for each of a number of situations 1202. In this example, the user has selected that the display element brightness should lower when the user glances away from the display element and turn off when the user looks away from the device. There can be any of a number of actions for each situation and any of a number of different situations specified. There can be other inputs as well, such as a sensitivity adjustment 1204 that can adjust how quickly the device reacts or the thresholds used to control device actions. In one embodiment, a highly sensitive setting can cause the device display element to shut off as soon as the user looks away from the display element, while a low sensitivity setting might cause the device to lower brightness of the display element, or power off, only when the user looks away for a certain amount of time or looks to a further distance from the device, etc.

Figure 13:
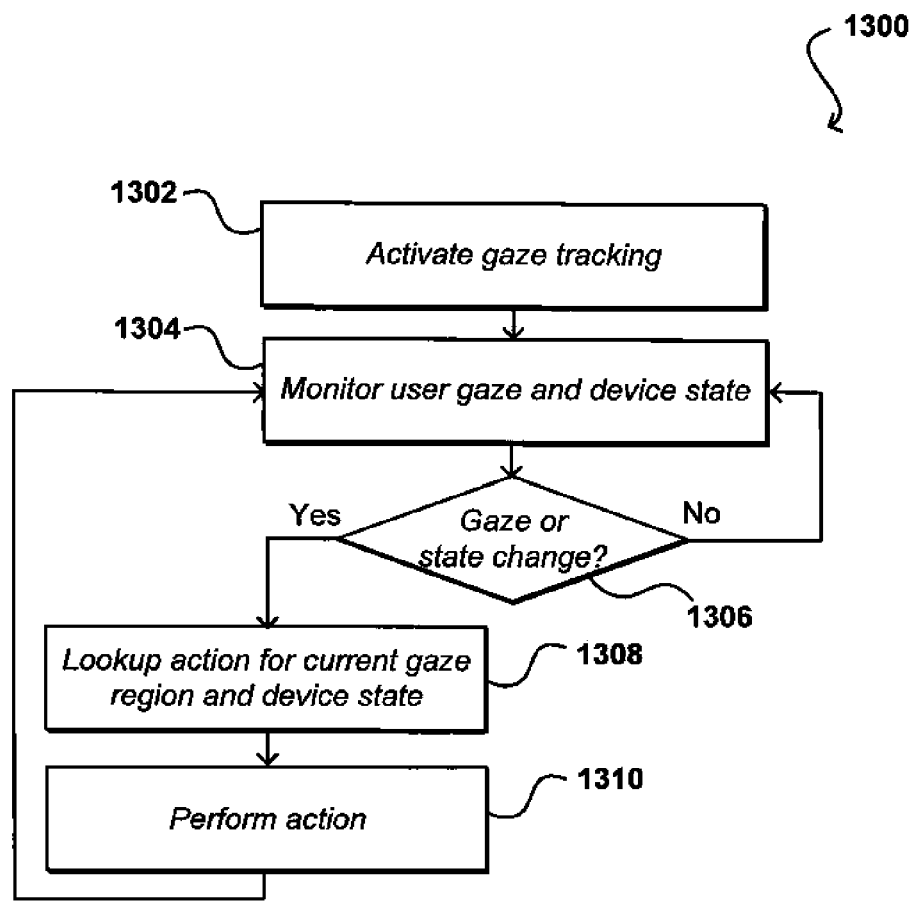
FIG. 13 illustrates an example process for taking determined actions on a computing device in response to changes in gaze direction or device state in accordance with one embodiment.

FIG. 13 illustrates an example process 1300 that can utilize settings such as those set forth in FIG. 12 to perform actions in response to various situations. In this example, gaze tracking is activated 1302 automatically or in response to user input. Once activated, the device can continually monitor user gaze direction, or field of view, as well as device state information 1304. As discussed above, device state information can include any type of information input or determined from any of a number of sources. For example, state information can include whether the device is being held by a user, such as may be determined by a touch-sensitive element, as well as whether the device is out in the open or in a contained environment, as may be determined by a light-detecting element, microphone circuit or other such element. The state information can also include information pertaining to applications or processes currently executing on the device.

The device can determine whether the region (e.g., at or away from the device) in which the user is gazing changes or if the state of the device changes in a significant way (e.g., the user is no longer holding the device) 1306. If either of these changes occur in a meaningful way, the device can look up the appropriate action to take for the change(s) 1308 as may be contained in memory, in a remote data store, in user settings or any other appropriate location. Once the appropriate action is determined, that action can be performed 1310. As discussed, this can include any of a number of actions, such as activating or deactivating a display element or enabling/disabling functionality associated with various device inputs, etc. The device can continue monitoring to determine subsequent changes that require additional actions.

In many of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

Figure 14:
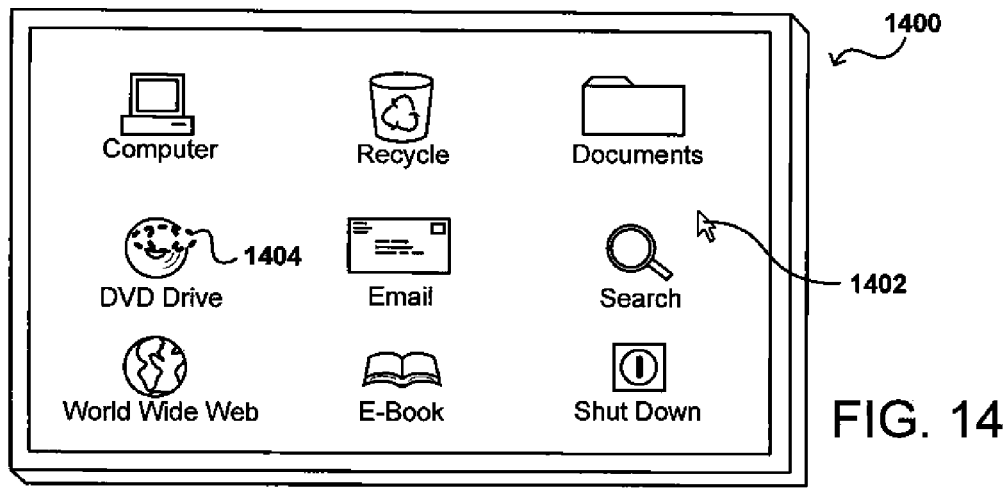
FIG. 14 illustrates an example of a display including icons for processes that can be at least partially executed based upon user gaze direction in accordance with one embodiment.

In order to address at least some of these and other such issues, approaches in accordance with various embodiments can also utilize information such as user gaze direction to activate resources that are likely to be used in order to spread out the need for processing capacity, memory space and other such resources. For example, FIG. 14 illustrates an example display 1400 including a plurality of icons, each of which has an action that can potentially be started before the user actually selects that icon. For example, a user wanting to play a movie on a DVD drive might look at the DVD drive icon (as shown by the view location graphic 1404) up to a couple of seconds before the user moves a cursor 1402 to that icon or otherwise selects that application. In some embodiments, when the device detects that the user is looking at the DVD drive icon, the device can begin spinning the DVD such that when the user accesses the DVD software, the disk will be spinning at the proper speed, and the device can quickly locate the desired information. In some embodiments, the device might also begin loading the DVD software into memory or otherwise perform operations that will reduce the time needed to launch the software. Similarly, a user looking at a disk drive icon or other such interface element can cause the appropriate component or element to prepare for access.

In some embodiments, a user might look at an icon for a Web browser or a hyperlink in a document, which can cause the device to submit a request for content to a home page or other URL designated to be opened with the browser application or hyperlink, such that the time needed to load and/or render the page upon execution of the browser application will be reduced. If a user looks at an icon for an e-book reader application or email program, for example, the device can begin loading content or preparing resources that will be needed for those applications. If a user looks at an icon to power down the device, for example, the device can begin to close down any unnecessary applications or otherwise prepare to shut down the device. Even if the user does not actually power off the device, shutting down unnecessary applications can reduce power and resource consumption, etc. In still another example, the device may detect when the user is reaching the last few words in a page and automatically initiate a page turn, without requiring the user to physically interact with the device. Additionally, if a video or animated ad is presented on the display element, the device may only play or animate the content when the user positions their gaze over that content.

Figure 15:
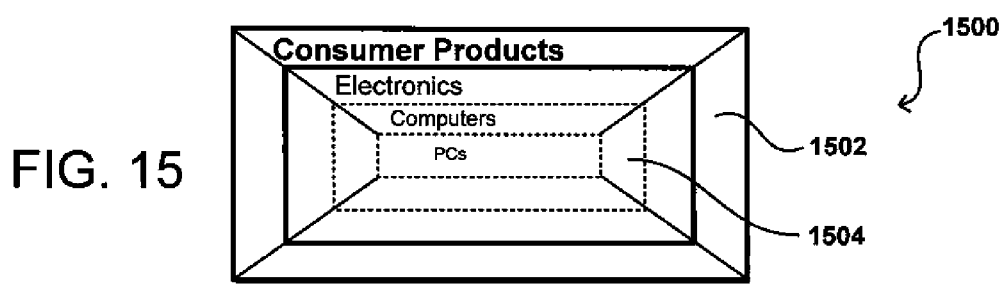
FIG. 15 illustrates an example of a multi-dimensional display that can be rendered based at least in part upon the viewing location of a user in accordance with one embodiment.

Further, the device can conserve resources by changing the way in which the device functions for specific applications. For example, FIG. 15 illustrates an example display 1500 wherein product information for a hierarchical categorization is displayed in a three-dimensional interface. When a device determines the viewing location and/or focus location of the user, the device can determine the category level of the interface that is currently being viewed by the user. In this situation, the device can conserve resources by only rendering the current level, and/or adjacent levels, at the full resolution, color depth, etc. For example, in the display 1500, it is determined that the user is looking at the consumer products level 1502. The device can then render the level at full resolution, color depth, etc., which can include pulling high resolution images for products at that level to be displayed to the user. Information at lower levels, such as at the 'computers' and 'PC' levels 1504 in this example, can be rendered at a lower resolution, etc., which can conserve processor usage, memory and power. Further, the images displayed at the non-current levels can be lower resolution images, or even stock or default images, that simply indicate that items are contained within those levels. As should be apparent, various other approaches to rendering information at different levels can be used as well.

Figure 16:
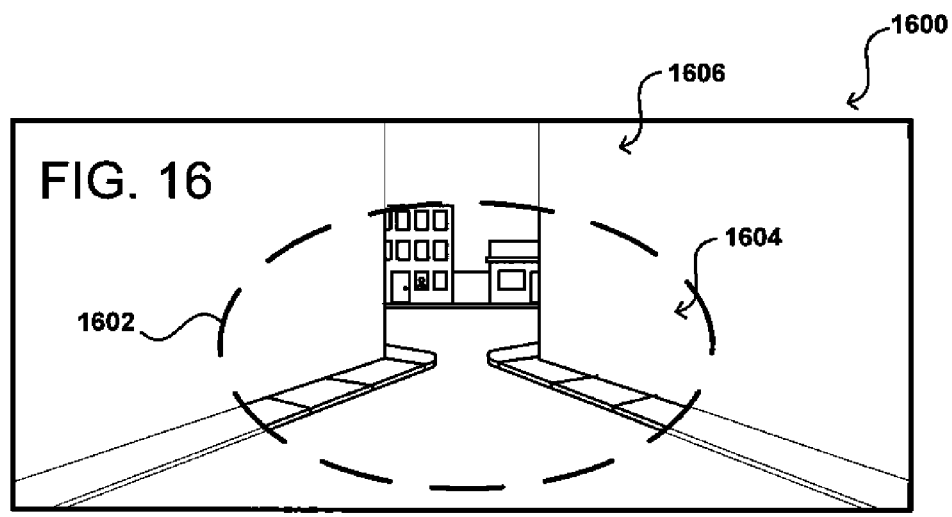
FIG. 16 illustrates an example of a display that can be rendered based at least in part upon the viewing location of a user in accordance with one embodiment.

While the amount of power and resources saved when viewing a categorical interface on a cell phone may be minimal, there are applications and devices where the savings in power and/or resources can be significant. For example, FIG. 16 illustrates an example of a display 1600 for a device that renders graphical information in three-dimensions, as above, but in a processor-intensive environment such as a video game or three-dimensional map that is capable of being viewed on a large format display device, such as a widescreen television. The device in this case might include multiple connected components, such as a computing device and separate display device, but the device can still determine user gaze direction with respect to the display. If a user is viewing information on a large format display, there will be a portion of the region that is in the direct viewing region of the user, and there can be other portions that are in the peripheral view of the user. Devices in accordance with certain embodiments can conserve processing power, or direct processing power where it is needed most, by treating the direct and peripheral view of the user differently.

For example, the computing device could determine (using one of the aforementioned or other calibration procedures) where the user is looking on the display element, as well as a boundary 1602 defining a primary view region 1604, based upon factors such as determined distance from the display element, display size, etc. The primary view region can be centered about a current viewing location of the user with respect to the display. Any items or content viewable within the primary view region can be rendered at full resolution, and items or content outside the primary viewing region can be rendered at a lower resolution, if at all. For example, the illustration shows a sidewalk visible in the primary viewing region. If there is a gold coin on the sidewalk outside of the viewing region, and the coin is an artistic feature that does not have any effect on the game, map, etc., then the device might not render the coin unless the user's gaze adjusts such that the viewable area now includes the coin, at which point the coin could be rendered. In other embodiments, the coin could be rendered whenever the coin is displayed on the display element but might only be rendered in full resolution when the viewing region includes the coin.

As discussed, the device can also determine a focus depth of the user. If the interface displayed is truly a three-dimensional interface (as opposed to a two-dimensional representation of a three-dimensional interface), then the device can selectively render items in the viewable region based upon a focus region or focus plane of the user. For example, there is a person in a window of a building in the viewing region in FIG. 16. Unless the user is focused on that building in the distance, the device would not have to render that person at full resolution. As discussed, such an approach can not only conserve processing power but can help to direct available processing power where it is needed most such that a device can appear to have more processing capability than is actually present. This approach also provides a benefit to users in that they are not overloaded with information while maintaining a sense of the whole rendered environment. In some devices, the device might actually fully render the entire image much of the time but can prioritize portions of the rendering such that different rendering levels can be used when needed. For example, in a game where a player is walking alone through an alley, the device might render the entire alley. If a swarm of zombies enters the alley, however, aspects of the alley might be rendered at a lower rendering level in order to provide the processing capability needed to render the additional characters. In addition to rendering portions of the objects at a lower rendering level, the user may also be able to directly interact with objects in the user's primary focus region. Continuing with the zombie example, the user could zap or otherwise destroy the zombies by looking directly at them. In such an example, the system detects that the user is looking directly at the zombie and, based, for example, on predetermined game behavior, detects that when the user is looking directly at certain objects in the game (the zombies), certain actions are taken.

Figure 17:
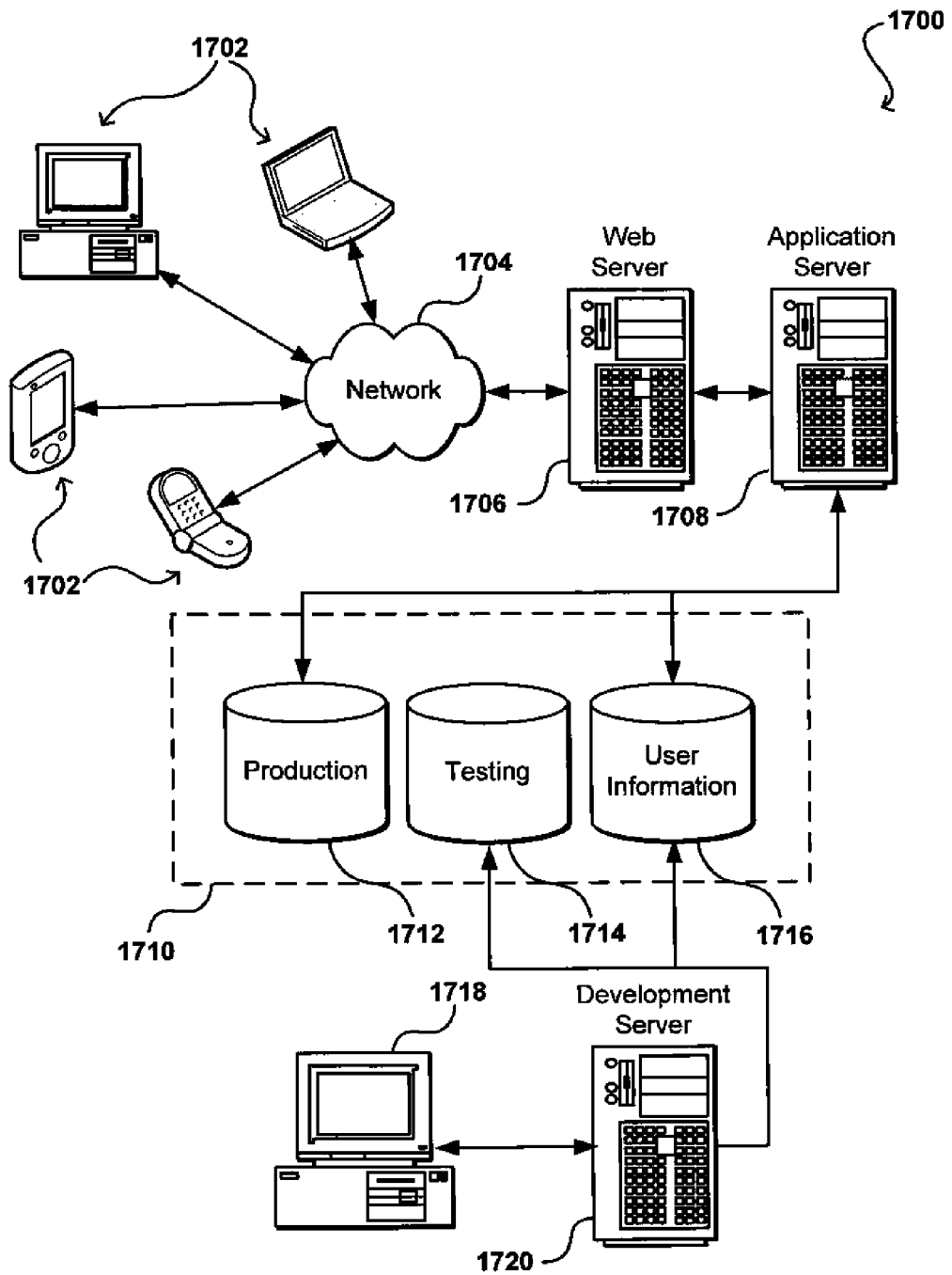
FIG. 17 illustrates an environment in which various embodiments can be implemented.

As discussed, different approaches can be implemented in various environments in accordance with the described embodiments. For example, FIG. 17 illustrates an example of an environment 1700 for implementing aspects in accordance with various embodiments. As will be appreciated, although a Web-based environment is used for purposes of explanation, different environments may be used, as appropriate, to implement various embodiments. The environment 1700 shown includes both a testing or a development portion (or side) and a production portion. The production portion includes an electronic client device 1702, which can include any appropriate device operable to send and receive requests, messages or information over an appropriate network 1704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1706 for receiving requests and serving content in response thereto, although for other networks an alternative device serving a similar purpose could be used, as would be apparent to one of ordinary skill in the art.

The illustrative environment includes at least one application server 1708 and a data store 1710. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1702 and the application server 1708, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 1718 allowing a user such as a developer, data administrator or tester to access the system. The user device 1718 can be any appropriate device or machine, such as is described above with respect to the client device 1702. The environment also includes a development server 1720, which functions similar to the application server 1708 but typically runs code during development and testing before the code is deployed and executed on the production side and is accessible to outside users, for example. In some embodiments, an application server can function as a development server, and separate production and testing storage may not be used.

The data store 1710 can include several separate data tables, databases or other data storage mechanisms and media for storing data relating to a particular aspect. For example, the data store illustrated includes mechanisms for storing production data 1712 and user information 1716, which can be used to serve content for the production side. The data store also is shown to include a mechanism for storing testing data 1714, which can be used with the user information for the testing side. It should be understood that there can be many other aspects that may need to be stored in the data store, such as page image information and access rights information, which can be stored in any of the above listed mechanisms as appropriate or in additional mechanisms in the data store 1710. The data store 1710 is operable, through logic associated therewith, to receive instructions from the application server 1708 or development server 1720 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 17. Thus, the depiction of the system 1700 in FIG. 17 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of controlling a computing device, comprising:
    obtaining image data using an imaging element of the computing device;
    determining that a user interacting with the computing device appears in at least one portion of the image data;
    analyzing the image data, using the computing device, to determine a gaze direction of the user in response to determining that the user appears in the at least one portion of the image data;
    determining a first region of a display element of the computing device, a second region that is outside a first boundary of the first region and within a second boundary, and a third region that is outside the second boundary, wherein at least one of the first boundary or the second boundary is adjusted over a period of time, the first region corresponding to a first user state in which the user is at least substantially gazing at the display element, the second region corresponding to a second user state in which the user is gazing away from the display element and at least substantially facing the computing device, and the third region corresponding to a third user state in which the user is gazing away from the display element and facing away from the computing device;
    causing the display element to be in a first power state and activating at least one of a plurality of input elements of the computing device, based at least in part upon the gaze direction being determined to be directed towards the first region;
    causing the display element to be in a second power state and altering a functionality of at least one of the plurality of input elements, based at least in part upon the gaze direction being determined to be directed towards the second region, the second power state having a lower power consumption rate than the first power state; and
    causing the display element to be in a third power state and deactivating functionality of at least one of the plurality of input elements, based at least in part upon the gaze direction being determined to be directed towards the third region, the third power state having a lower power consumption rate than the second power state.

2. The method according to claim 1, wherein the first power state is an on state and the third power state is an off state.

3. The method according to claim 1, wherein:
    the first power state comprises at least one of a first contrast, a first brightness, and a first resolution;
    the second power state is one of a plurality of power states each comprising at least one of a second contrast, a second brightness, and a second resolution; and
    the third power state comprises at least one of a third contrast, a third bright, and a third resolution.

4. The method according to claim 1, wherein analyzing the image data to determine the gaze direction of the user comprises analyzing the at least one portion of the image data to determine at least one of a state, or a change in a set of measurable aspects, corresponding to facial features of the user of the computing device.

5. The method according to claim 4, wherein the set of measurable aspects includes at least one of a dimension of at least one eye of the user, a dimension of at least one pupil of the user, a dimension of at least one retina of the user, a separation of features on a face of the user, a relative location of a feature on the face of the user, or a relative orientation between at least two features on the face of the user.

6. The method according to claim 1, wherein analyzing the image data to determine the gaze direction of the user further comprises analyzing the image data to determine a change in relative orientation between the user and the computing device.

7. The method according to claim 1, wherein the imaging element includes at least one of a digital camera element or an infrared radiation detector.

8. The method according to claim 1, wherein the plurality of input elements includes at least one of a touch-sensitive element, a keyboard, a keypad, a roller button, a second imaging element, an audio-capturing element, a power button, a power charging element, or a physical switch.

9. A method of controlling a computing device, comprising:
    obtaining image data using an imaging element of the computing device;
    determining that a user interacting with the computing device appears in at least one portion of the image data;
    obtaining environmental data from an environment-determining element of the computing device;
    analyzing, using the computing device, the image data to determine a gaze direction of the user and the environmental data to determine an environmental state in response to determining that the user appears in the at least one portion of the image data;
    determining a first zone of a display element of the computing device, a second zone that is outside a first boundary of the first zone and within a second boundary, and a third zone that is outside the second boundary, wherein at least one of the first boundary or the second boundary is adjusted over a period of time, the first zone corresponding to a first user state in which the user is at least substantially gazing at the display element, the second zone corresponding to a second user state in which the user is gazing away from the display element and at least substantially facing the computing device, and the third zone corresponding to a third user state in which the user is gazing away from the display element and facing away from the computing device;
    causing the display element to be in a first power state and activating at least one of a plurality of input elements of the computing device, based at least in part upon the gaze direction of the user being determined to be directed towards the first zone;

causing the display element to be in a second power state and altering a functionality of at least one of the plurality of input elements based at least in part upon the environmental state and the gaze direction of the user being determined to be directed towards the second zone; and causing the display element to be in a third power state and deactivating functionality of at least one of the plurality of input elements, based at least in part upon the gaze direction of the user being determined to be directed towards the third zone.

10. The method according to claim 9, wherein:

the first power state is an on state, and causing the display element to be in the first power state is in further response to determining that the user is holding the computing device, as determined from the environmental data;

the second power state is one of a plurality of power states each comprising at least one of a respective contrast, a respective brightness, or a respective resolution; and the third power state is an off state, and causing the display element to be in the second power state is in further response to determining that the user is not holding the computing device, as determined from the environmental data.

11. The method according to claim 9 wherein the at least one user input element includes at least one of a touch-sensitive element, a keyboard, a keypad, a roller button, a second imaging element, an audio-capturing element, a power button, a power charging element, or a physical switch.

12. The method according to claim 9, wherein the at least one environment-determining element includes at least one of a touch-sensitive element, an orientation determining element, an audio recording element, or a light sensing element.

13. The method according to claim 12, wherein the orientation determining element is at least one of an accelerometer, a motion detector, an electronic compass, a global-positioning system receiver, or an electronic level.

14. The method according to claim 9, further comprising: utilizing calibration information to analyze the image data and the environmental data.

15. The method according to claim 9, wherein causing the display element to be in the first power state, causing the display element to be in the second power state, and causing the display element to be in the third power state are each further based at least in part upon at least one application executing on the computing device.

16. A computing device, comprising:

a processor;

a display element for displaying a graphical user interface;

an imaging element;

a plurality of input elements;

a non-transitory memory device including instructions operable to be executed by the processor to perform a set of actions, the instructions, upon being executed by the processor, causing the computing device to:

obtain image data using the imaging element;

determine that a user interacting with the computing device appears in at least one portion of the image data;

analyze the image data to determine a gaze direction of the user in response to determining that the user appears in the at least one portion of the image data;

determine a first zone that includes at least one portion of the display element, a second zone that is outside a first boundary of the first zone and within a second boundary, and a third zone that is outside the second boundary, wherein at least one of the first boundary or the second boundary is adjusted over a period of time, the first zone corresponding to a first user state in which the user is at least substantially gazing at the display element, the second zone corresponding to a second user state in which the user is gazing away from the display element and at least substantially facing the computing device, and the third zone corresponding to a third user state in which the user is gazing away from the display element and facing away from the computing device;

cause the display element to be in a first power state and activate at least one of the plurality of input elements, based at least in part upon the gaze direction being determined to be directed towards the first zone;

cause the display element to be in a second power state and alter a functionality of at least one of the plurality of input elements, based at least in part upon the gaze direction being determined to be directed towards the second zone; and cause the display element to be in a third power state and deactivate functionality of at least one of the plurality of input elements, based at least in part upon the gaze direction being determined to be directed towards the third zone.

17. The computing device according to claim 16, wherein:

the first power state is at least one of an on power state or a state with at least one of a first contrast, a first brightness, or a first resolution;

the second power state is one of a plurality of states each comprising at least one of a second contrast, a second brightness, or a second resolution; and the third power state is at least one of an off power state or a state with at least one of a third contrast, a third brightness, or a third resolution.

18. The computing device according to claim 16, wherein the imaging element includes at least one of a digital camera element or an infrared radiation detector.

19. The computing device according to claim 16, wherein the plurality of input elements includes at least one of a touch-sensitive element, a keyboard, a keypad, a roller button, a second imaging element, an audio-capturing element, a power button, a power charging element, or a physical switch.

20. A non-transitory computer-readable storage medium storing processor-executable instructions for controlling a computing device, the processor-executable instructions, upon being executed by a processor of the computing device, causing the computing device to perform:

obtaining image data using an imaging element;

determining that a user interacting with the computing device appears in at least one portion of the image data;

analyzing the image data to determine a gaze direction of a user in response to determining that the user appears in the at least one portion of the image data;

determining a first zone of a display element of the computing device, a second zone that is outside a first boundary of the first zone and within a second boundary, and a third zone that is outside the second boundary, wherein at least one of the first boundary or the second boundary is adjusted over a period of time, the first zone corresponding to a first user state in which the user is at least substantially gazing at the display element, the second zone corresponding to a second user state in which the user is gazing away from the display element and at least substantially facing the computing device, and the third zone corresponding to a third user state in which the user is gazing away from the display element and facing away from the computing device;

causing the display element to be in a first power state and activating at least one of a plurality of input elements of the computing device, based at least in part upon the gaze direction being determined to be directed towards the first zone;

causing the display element to be in a second power state and altering a functionality of at least one of the plurality of input elements, based at least in part upon the gaze direction being determined to be directed towards the second zone; and causing the display element to be in a third power state and deactivating functionality of at least one of the plurality of input elements, based at least in part upon the gaze direction being determined to be directed toward the third zone.

21. The non-transitory computer-readable storage medium according to claim 20, wherein:

the first power state is at least one of an on power state or a state with at least one of a first contrast, a first brightness, or a first resolution;

the second power state is one of a plurality of states each comprising at least one of a second contrast, a second brightness, or a second resolution; and the third power state is at least one of an off power state or a state with at least one of a third contrast, a third brightness, or a third resolution.

22. The non-transitory computer-readable storage medium according to claim 20, wherein the imaging element includes at least one of a digital camera element or an infrared radiation detector.

23. The non-transitory computer-readable storage medium according to claim 20, wherein the plurality of input elements includes at least one of a touch-sensitive element, a keyboard, a keypad, a roller button, a second imaging element, an audio-capturing element, a power button, a power charging element, or a physical switch.

* * * * *